United States Patent
Tsai

(10) Patent No.: US 6,206,387 B1
(45) Date of Patent: Mar. 27, 2001

(54) COLLAPSIBLE SKATEBOARD

(76) Inventor: Shui-Te Tsai, P.O. Box 82-144, Taipei (TW)

( * ) Notice: Subject to any disclaimer, the term of this patent is extended or adjusted under 35 U.S.C. 154(b) by 0 days.

(21) Appl. No.: 09/222,840

(22) Filed: Dec. 30, 1998

(51) Int. Cl.[7] .................................................. B62M 1/00
(52) U.S. Cl. ................................... 280/87.041; 280/14.3; 280/278; 16/359; 403/92
(58) Field of Search .................... 280/87.021, 87.041, 280/87.042, 87.05, 14.3, 278, 287; 16/358, 359, 322, 326, 349, 348; 403/91, 92, 93, 94, 96; 248/188.6

(56) References Cited

U.S. PATENT DOCUMENTS

| | | | |
|---|---|---|---|
| 1,297,282 | * 3/1919 | White | 280/87.021 |
| 1,391,312 | * 9/1921 | Gebhardt | 280/14.3 |
| 1,658,068 | * 2/1928 | White | 280/87.041 |
| 1,687,953 | * 10/1928 | Starks | 403/92 |
| 1,968,975 | * 8/1934 | Upsacker et al. | 280/14.3 |
| 2,546,711 | * 3/1951 | Amendt | 280/87.05 |
| 3,396,928 | * 8/1968 | Lay | 248/188.6 |
| 4,707,884 | * 11/1987 | Chang | 280/87.041 |
| 4,735,392 | * 4/1988 | Farmer | 248/188.6 |
| 4,905,946 | * 3/1990 | Wang | 403/92 |
| 5,102,079 | * 4/1992 | Lee | 248/166 |
| 5,183,129 | * 2/1993 | Powell | 280/278 |
| 5,437,425 | * 8/1995 | Hou | 403/91 |
| 5,927,733 | * 7/1999 | Banda | 280/87.05 |

* cited by examiner

Primary Examiner—J. J. Swann
Assistant Examiner—Christopher Bottorff
(74) Attorney, Agent, or Firm—Browdy and Neimark

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

2 Claims, 6 Drawing Sheets

COLLAPSIBLE SKATEBOARD

BACKGROUND OF THE INVENTION

1. Field of the Invention

This invention is related to an improvement in the structure of a collapsible skateboard.

2. Description of the Prior Art

The conventional skateboard with an upright handle is fixed in structure so that it is difficult to carry. Hence, a collapsible skateboard has been developed to obviate this drawbacks. However, such a collapsible skateboard is complicated in structure and expensive in cost. Furthermore, the handle of the collapsible skateboard cannot be kept at a fixed position, thereby making it inconvenient to use.

SUMMARY OF INVENTION

Therefore, it is an object of the present invention to provide an improved collapsible skateboard which can obviate and mitigate the above-mentioned drawbacks.

This invention is related to an improvement in the structure of a collapsible skateboard.

It is the primary object of the present invention to provide a collapsible skateboard which includes an upright handle having a lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

DETAILED DESCRIPTION OF THE PREFERRED EMBODIMENT

Figure 1:
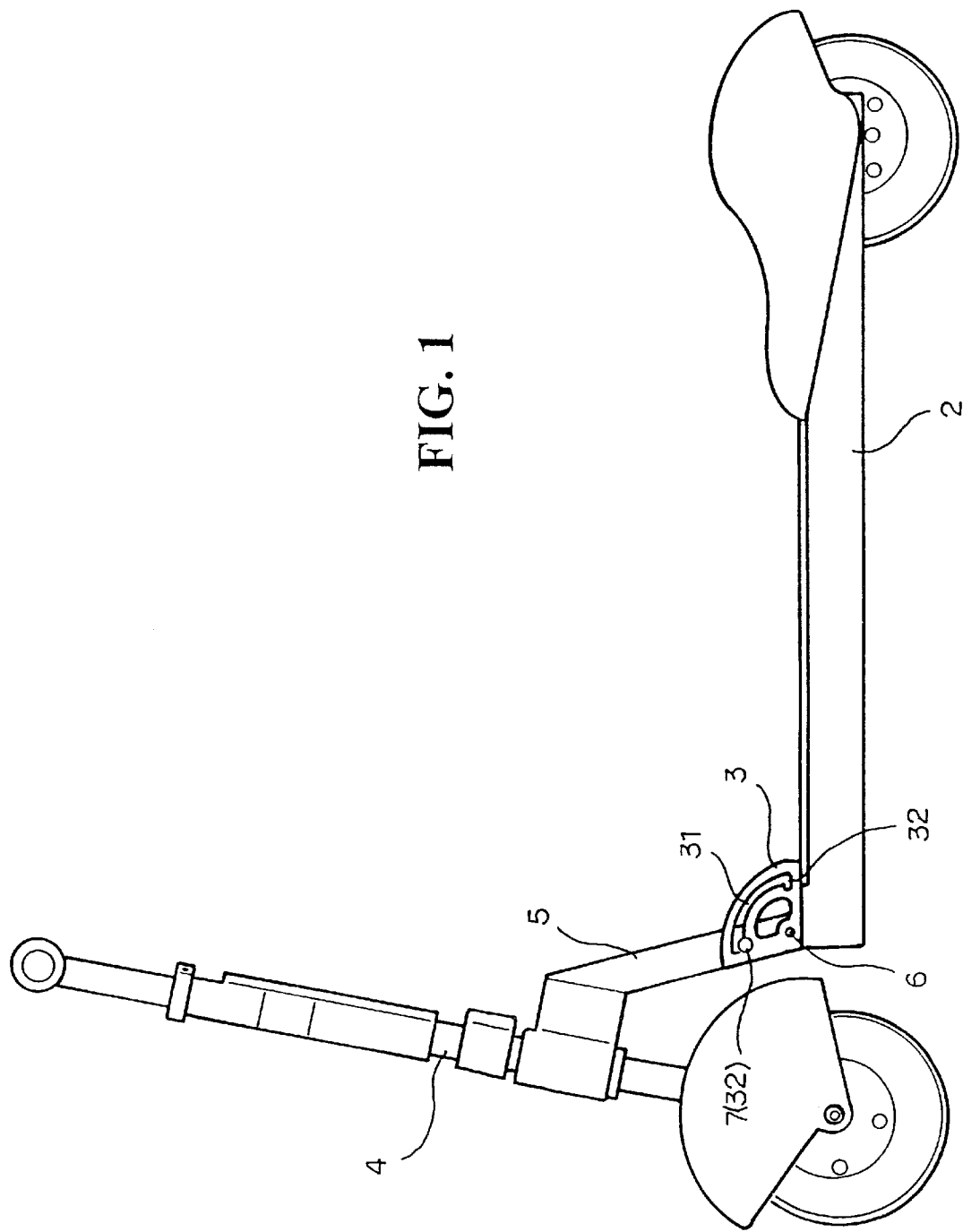
FIG. 1 is a side view of the present invention.
Figure 2:
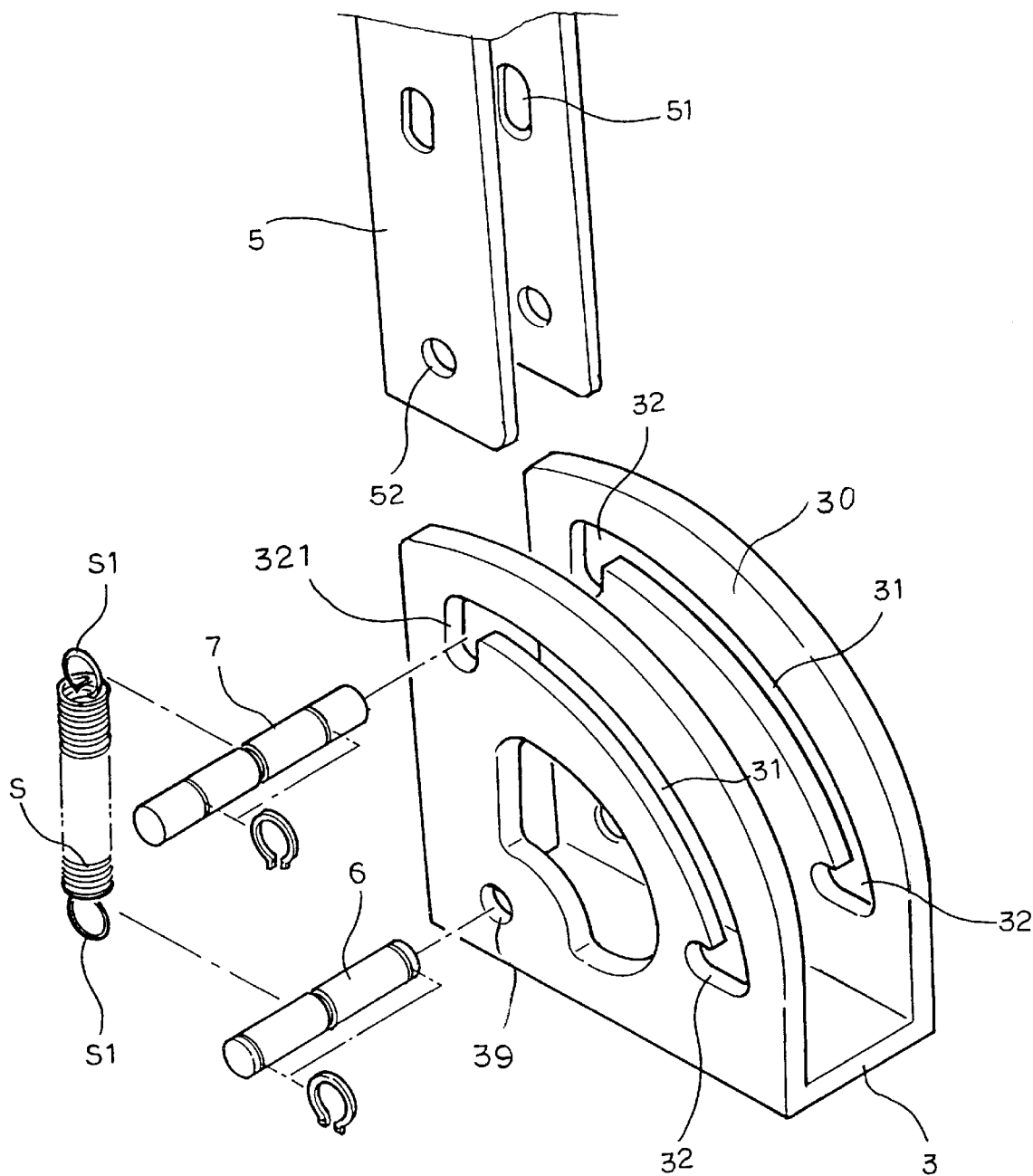
FIG. 2 is an exploded view of the present invention.
Figure 3:
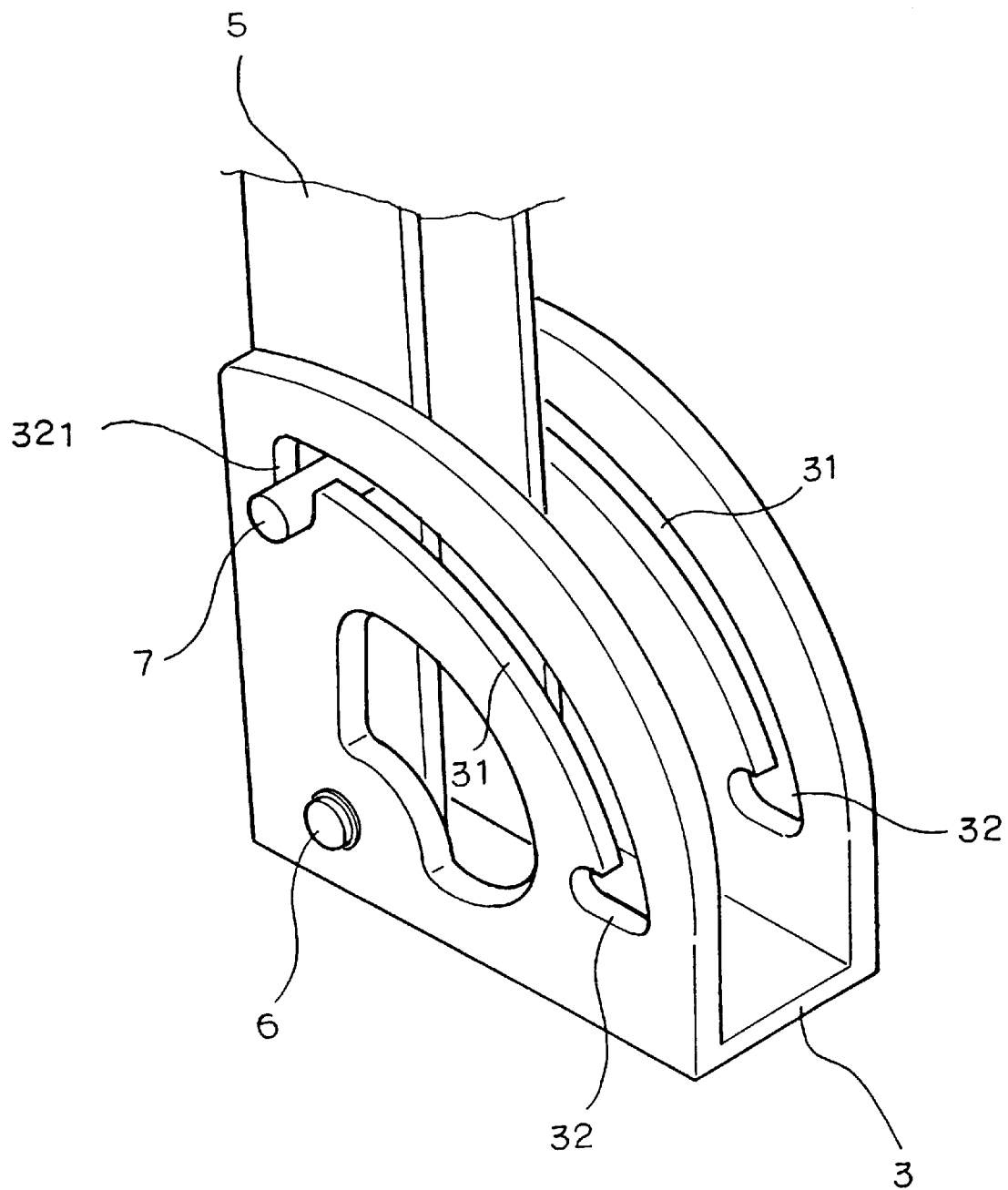
FIG. 3 is a perspective view of the present invention.
Figure 4:
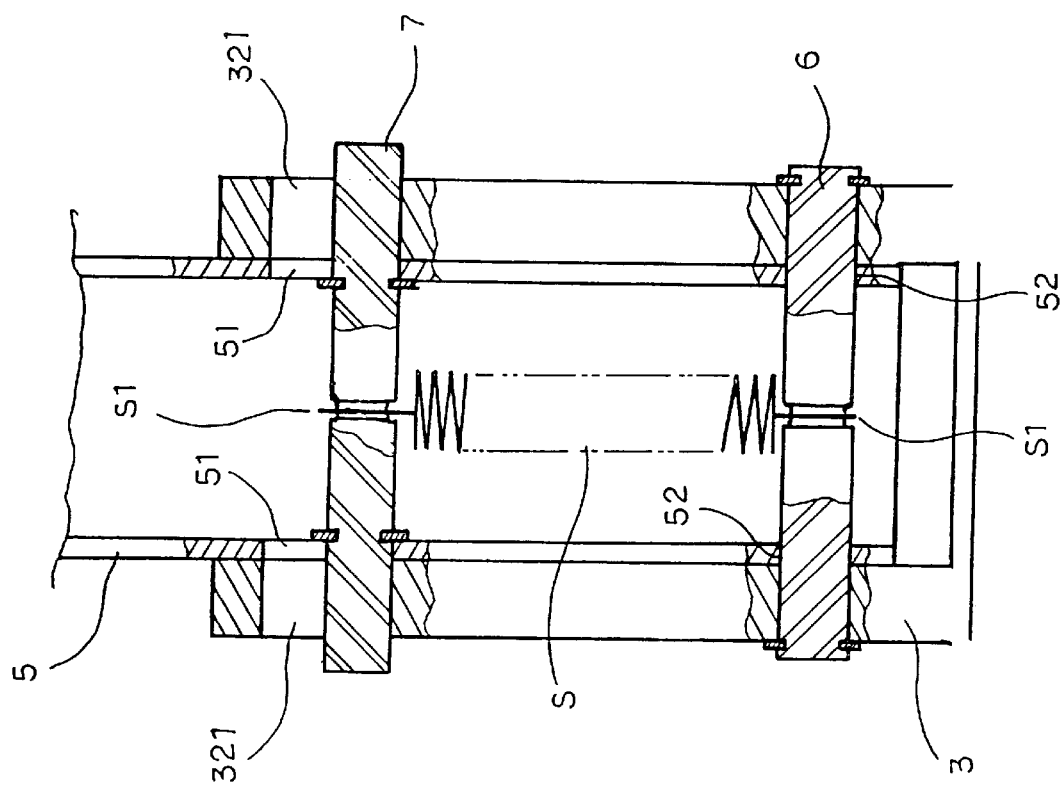
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical recess 321 at the upper end. Each lug 30 is further formed with a circular hole 39 below the vertical recess 321. An adjust pin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end Si connected to the intermediate portion of the adjust pin 7 and a lower end connected to the intermediate portion of the pivot pin 6 so that the adjust pin 7 will be retained within the vertical recess 321 thereby keeping the handle 4 at an upright position.

Figure 5:
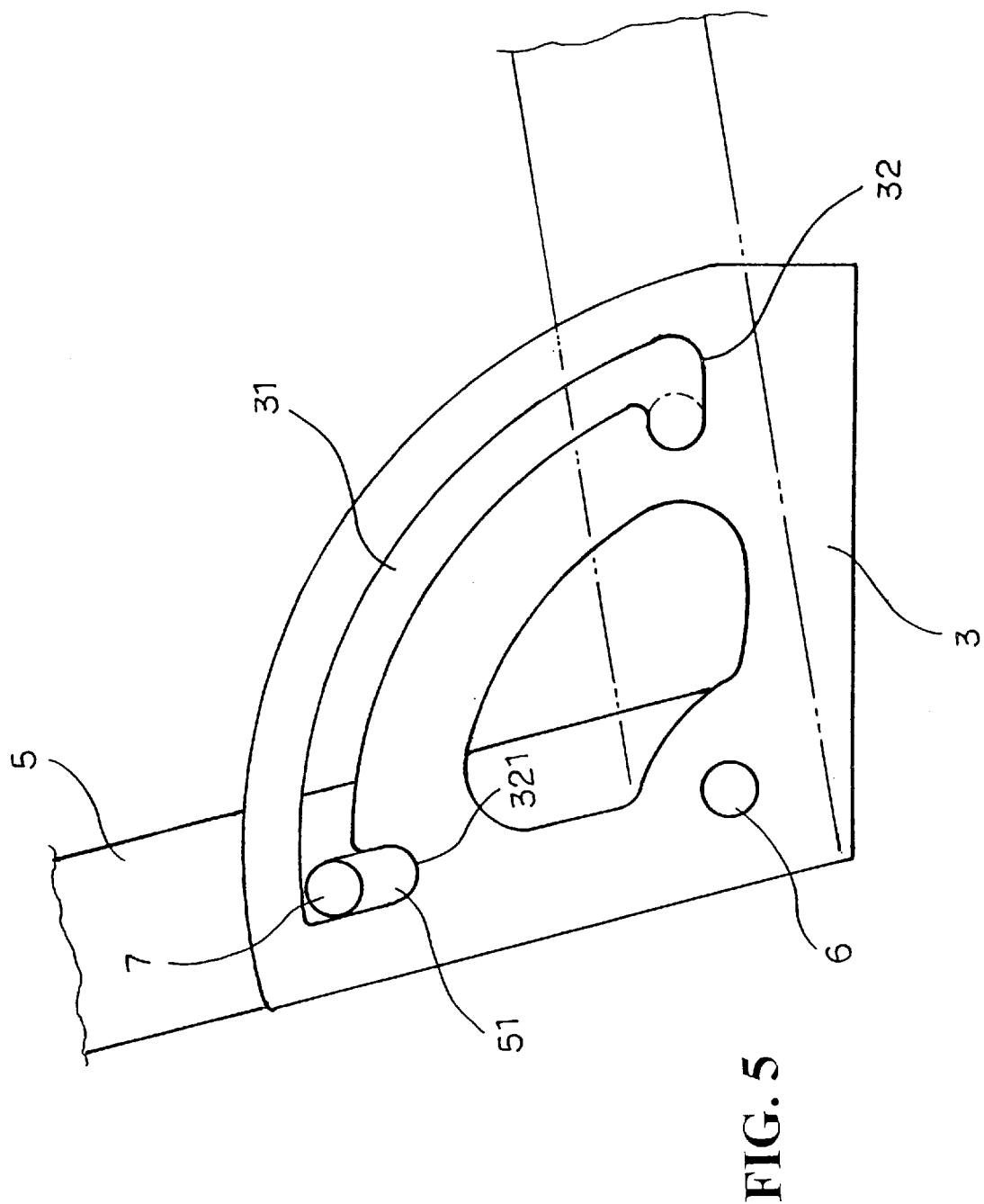
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When put in use from the folded position, simply move the handle 4 along the direction of the platform 2 so that the adjust pin 7 is moved along the curved slots 31 to engage with the vertical recesses 321.

Figure 6B:
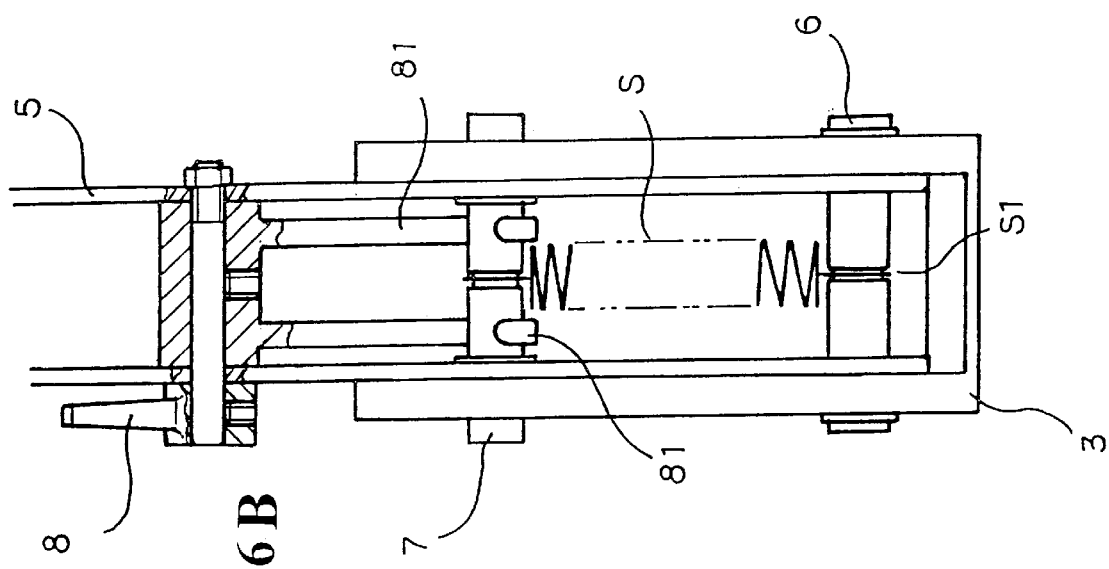
FIGS. 6A and 6B illustrate another preferred embodiment of the present invention.
Figure 6A:
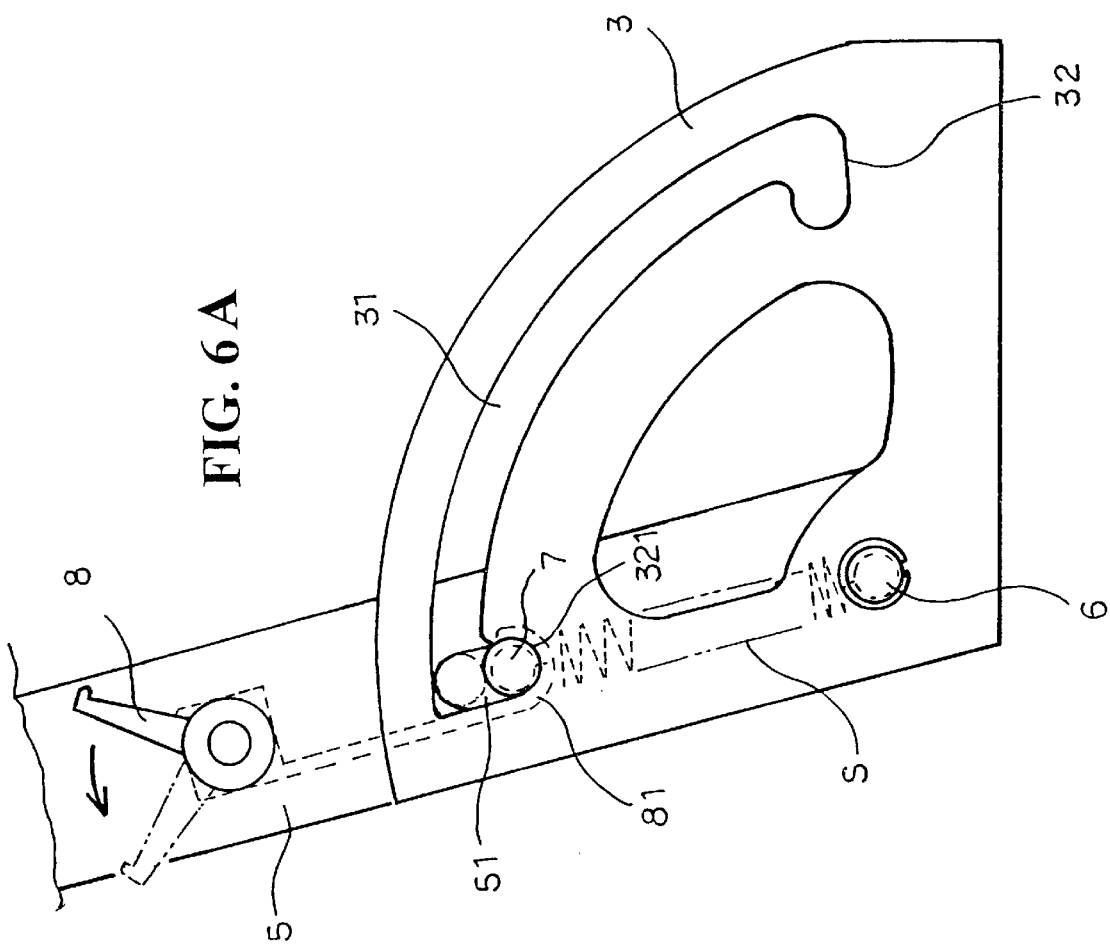

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

I claim:

1. A collapsible skateboard comprising:

a platform, an upright handle having a lower portion on which is fixedly mounted a bracket, said bracket being fixedly mounted on said handle and having at least a leg extending downwardly toward said platform, said leg having an elongated hole and a circular hole below said elongated hole;

a connector having a curved slot having a lower end formed with a horizontal recess, an upper end formed with a vertical recess, and a circular hole under said vertical recess;

an adjust pin inserted into said vertical recess of said connector and said elongated hole of said bracket;

a pivot pin fitted through said circular hole of said connector and said circular hole of said bracket;

a spring having an upper end connected to said adjust pin and a lower end to said pivot pin;

said connector being fixedly mounted on said platform; and a control mechanism which includes a cylindrical member pivotally mounted on said bracket and having an end extending out of said bracket fixedly connect with a lever and a hook extending downwardly within said bracket to engage with said adjust pin.

2. The collapsible skateboard as claimed in claim 1, wherein said connector is a U-shaped member having two upwardly extending lugs each formed with said curved slot.

\* \* \* \* \*